June 2, 1970 R. E. MATICK ET AL 3,516,078

APPARATUS FOR SELECTION OF MEMORY WORD LOCATION

Filed June 17, 1964 3 Sheets-Sheet 1

INVENTORS
RICHARD E. MATICK
JACOB R. MAYFIELD
BY Bernard N. Wiener
ATTORNEY

United States Patent Office 3,516,078

Patented June 2, 1970

3,516,078

APPARATUS FOR SELECTION OF MEMORY WORD LOCATION

Richard E. Matick and Jacob R. Mayfield, Peekskill, N.Y., assignors to International Business Machines Corporation, New York, N.Y., a corporation of New York Filed June 17, 1964, Ser. No. 375,839
Int. Cl. G11c 7/02
U.S. Cl. 340—174 13 Claims

ABSTRACT OF THE DISCLOSURE

This invention provides a logic circuit for memory location selection. Broadly, the circuit includes a transmission line transformer for each memory location to obtain high frequency response for the selected location and voltage isolation for unselected locations. In one embodiment of the invention, the logic circuit includes a selection matrix, e.g., diode selection matrix, with a transmission line transformer for each memory location to obtain high frequency response for the selected location and voltage isolation of unselected locations. In another embodiment of the invention, a pulse transformer with a grounded center tap on its secondary winding is used with a diode selection matrix for obtaining a balanced drive of a selected memory location.

This invention relates to logic circuits for selection of a memory word and it relates more particularly to diode selection matrix switches for selection of a memory word location.

A memory usually has discrete word locations for storage of digital information. The storage or retrieval of the information requires a technique to specify the particular location without otherwise disturbing other memory locations. One class of memory that has this requirement utilizes magnetic regions or elements for storage of units of information. In order to translate information to or from the word location, a current is caused to link magnetically the region or element. The read-only memory is one wherein information is stored either on a permanent or semi-permanent basis and is continuously available on a non-destructive readout basis. Exemplary of read-only memories is the memory provided by copending application S.N. 159,432, filed Dec. 14, 1961 now abandoned for continuing application Ser. No. 518,257, now Pat. No. 3,298,005 by R. E. Matick for 'Thick Film Read-Only Memory." In the operation of this memory, it is particularly important that a particular memory location be uniquely selected by a balance drive under relatively high frequency operation in order to reduce noise. A balanced drive for a memory location requires that voltages of equal and opposite polarities with reference to the system ground be applied to the terminals of the word location.

It is the primary object of this invention to provide a logic circuit for memory word selection which has good noise inhibiting characteristics..

It is another object of this invention to provide a logic circuit for memory word location selection which obtains balanced drive for the selected location and voltage isolation of the unselected locations to minimize noise induced on respective sense lines.

It is another object of this invention to provide a logic circuit for memory location selection which obtains balanced drive for the selected location and voltage isolation for the unselected locations through use of a transformer.

It is another object of this invention to provide a logic circuit for memory word selection which includes a diode selection matrix coupled to the memory location by respective transmission line transformers to obtain voltage isolation of the unselected locations.

It is another object of this invention to provide a logic circuit for memory word selection which includes a diode selection matrix coupled via respective transmission line transformers to each memory word to obtain a balanced drive for the selected word and voltage isolation for the unselected words.

It is another object of this invention to provide a logic circuit for memory word selection in a read-only memory which includes a diode selection matrix coupled via transmission line transformers to each memory word to obtain a balanced drive for the selected word and voltage isolation for the unselected words.

The foregoing and other objects, features and advantages of the invention will be apparent from the following more particular description of preferred embodiments of the invention as illustrated in the accompanying drawings.

The objects and advantages of this invention are obtained through provision of a logic circuit for memory location selection. Broadly, the circuit for the practice of one feature of the invention includes a transmission line transformer for each memory location to obtain high frequency response for the selected location and voltage isolation of unselected locations. In greater detail, the logic circuit includes a diode selection matrix with a transmission line transformer for each memory word to obtain a balanced drive for the selected word and voltage isolation for the unselected words.

In the practice of another feature of this invention, a pulse transformer having a grounded center tap on its secondary winding is used in a diode selection matrix for obtaining a balanced drive of a selected memory location.

As characterized in the practice of this invention, a transmission line transformer consists of a short length of transmission line in conjunction with a ferromagnetic material. A background reference on transmission line transformers is the article in the Proceedings of the IRE for August 1959 at pages 1337 to 1342. An illustrative text for background material of general interest for the practice of this invention is: Basics of Digital Computers by J. S. Murphy, John F. Rider Publisher, Inc., 1958. Several different transmission line transformers may be used for the practice of this invention. Illustratively, a twisted pair of insulated wires, a narrow and thin parallel strip line or coaxial line may be the transmission line transformer for the practice of this invention. The ferromagnetic material may be in the form of a ferrite core upon which the transmission line is wound or it may surround the transmission line in accordance with the prior art of transmission line transformers. The ferromagnetic material associated with several transmission line transformers need not be separate and discrete entities. Illustratively, several transmission lines may pass through a hole in a block of ferromagnetic material.

Figure 1:
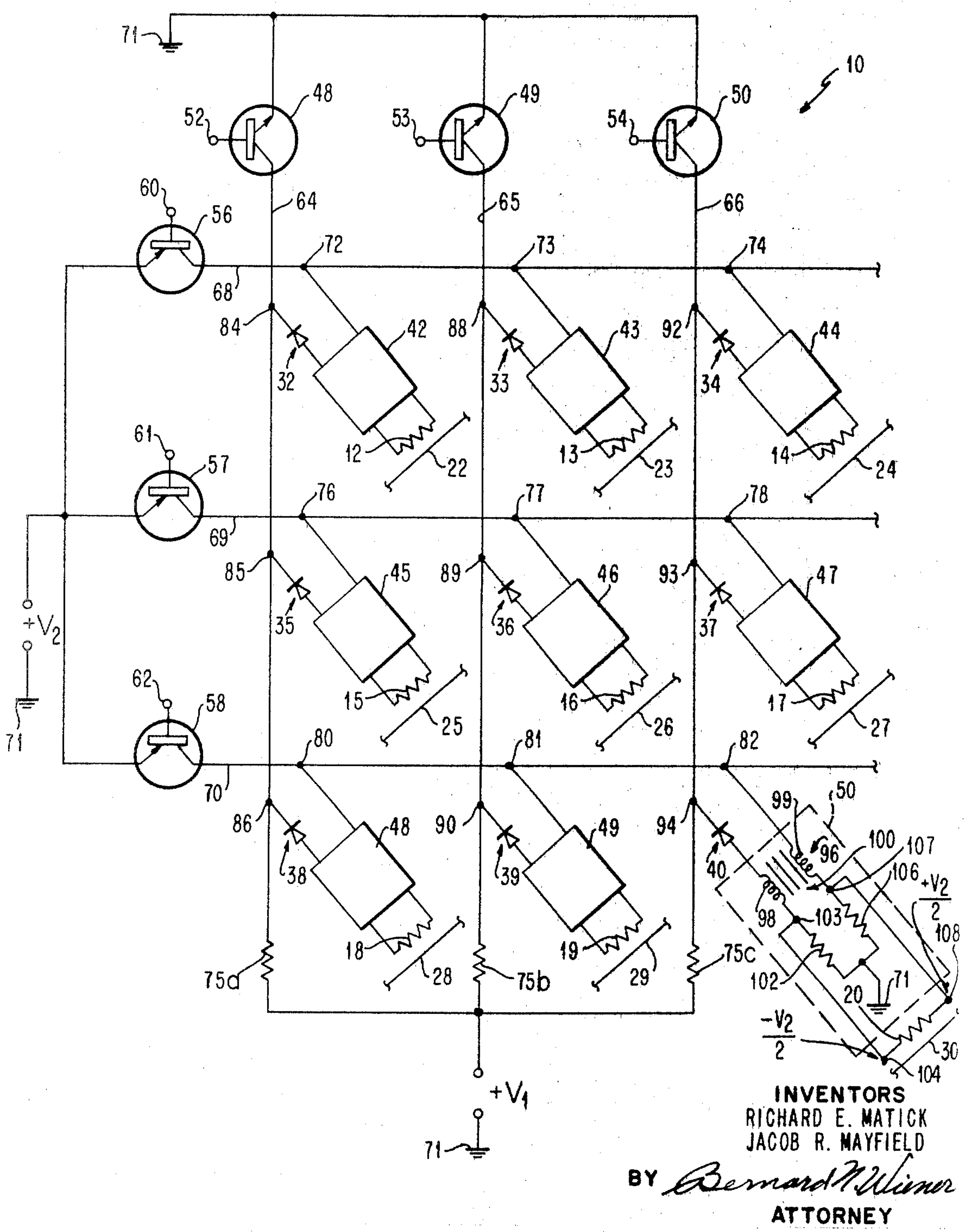
FIG. 1 is a schematic diagram illustrating the principles of a logic circuit for memory word selection in accordance with this invention which illustrates the incorporation of a transmission line transformer to obtain balanced drive for the selected word and voltage isolation for the unselected memory words.
Figure 2:
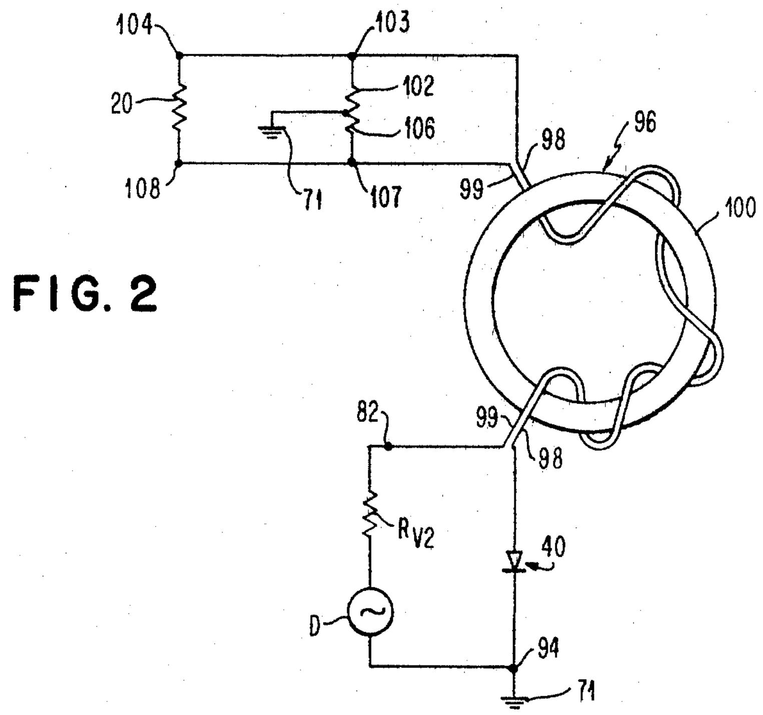
FIG. 2 is a schematic diagram illustrating the nature of a particular transmission line transformer uitilizing a ferrite core suitable for the practice of this invention.

The nature and operation of the embodiment 10 of this invention presented in FIG. 1 will now be described with reference to the operation of the transmission line transformer circuit shown in FIG. 2. Illustrative memory words 12 to 20 are available to be selected by the operation of embodiment 10. Associated with memory words 12 to 20 are sense lines 22 to 30. When a particular memory word is selected by the operation of the embodiment 10, the indication of the information stored therein is made available on the respective sense line. Diodes 32 to 40 are associated with memory words 12 to 20, respectivedly. Interposed between diodes 32 to 40 and the memory words 12 to 20 are the transmission line transformer circuits 42 to 50, respectively.

Figure 3:
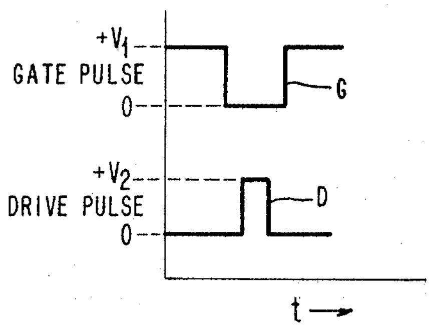
FIG. 3 is a timing diagram for the embodiment of FIG. 1 illustrating the timing relationship between a gate pulse on a gate line and a drive pulse on a corresponding drive line.

Generally, one of the gate NPN transistors 48 to 50 is activated by a pulse, not shown, applied to the base thereof via the respective base terminal 52 to 54 to obtain a gate pulse G (FIG. 3) on the respective gate line. After the particular gate transistor has been activated, one of the drive PNP transistors 56 to 58 is activated by a pulse, not shown, applied to the base thereof via the respective base terminal 61 to 62 to obtain a drive pulse D (FIG. 3) on the respective drive line.

Gate transistors 48 to 50 are connected by their collectors to gate lines 64 to 66, respectively; and drive transistors 56 to 58 are connected to drive lines 68 to 70, respectively. When a gate transistor 48 to 50 is activated, the emitter thereof connects voltage $+V_1$ to ground via the respective resistance *75a* to *75c*. When a drive transistor 56 to 58 is activated, the voltage $+V_2$ is applied to the respective collector to the respective drive line 68 to 70. Consequently, voltage $+V_2$ is applied to terminals 72 to 74 of transmission line transformer circuits 42 to 44 if drive transistor 56 is activated; voltage $+V_2$ is applied to terminals 76 to 78 of transmission line transformer circuits 45 to 47 if drive transistor 57 is activated; and voltage $+V_2$ is applied to terminals 80 to 82 of transmission line transformer circuits 48 to 50 if transistor 58 is activated.

When gate transistor 48 is activated, terminals 84 to 86 of the anodes of diode 32, 35 and 38 are effectively connected to ground 71; when gate transistor 49 is activated, terminals 88 to 90 of the anodes of diode 33, 36 and 39 are connected to ground 71; and when gate transistor 50 is activated, terminals of the anodes of diodes 34, 37 and 40 are connected to ground 71. In order to select a particular memory word 12 to 20 of FIG. 1 by the operation of embodiment 10, a gate transistor 48 to 50 is activated and thereafter a drive transistor 56 to 58 is activated. Illustartively, if gate transistor 50 and drive transistor 58 are activated, the memory word 20 is selected with a consequent information indication on sense line 30. The selection of memory word 20 is obtained by applying voltage $-V_2/2$ to its terminal 104 via terminal 103 of transmission line transformer 96; and by applying voltage $+V_2/2$ to its terminal 108 via terminal 107 of transmission line transformer 96.

The structure of a transmission line transformer circuit 42 to 50 of the embodiment 10 of FIG. 1 will now be described. With reference to transmission line transformer 50 of FIG. 1 and the diagram of FIG. 2, transmission line transformer 96 for the practice of this invention has a pair of conductors 98 and 99 associated with a ferromagnetic material 100. In FIG. 2, the pair of conductors is a pair of twisted wires which are found on a ferrite core. Conductor 98 is connected at one end via diode 40 to terminal 94 on gate line 66; and conductor 99 is connnected at one end to terminal 82 on drive line 70. The resistance $R_{V2}$ shown in FIG. 2 represents the internal resistance of voltage source $+V_2$ and the time varying voltage D represents the drive pulse D applied to terminal 82. Conductor 98 of transmission line transformer 100 is connected at the other end via resistance 102 to ground 71 and to terminal 104 of memory word 20. Conductor 99 is connected at the other end via resistance 106 to ground 71 and to terminal 108 of memory word 20. Resistances 102 and 106 are of equal value.

The operation of the embodiment 10 and design considerations for circuit elements will now be described in greater detail. In the first instance, the manner of selection of memory word 20 will be presented. Initially, under ideal conditions the drive lines 68 to 70 are at ground potential and the gate lines 64 to 66 at a positive potential $V_1$ with respect to ground 71. Therefore, for exemplary word 20, current does not flow through resistance *75c* or diode 40 and there is no current flow in either drive line 70 or gate line 66. In the operation of embodiment 10, if the memory word 20 is to be selected, the base terminal 54 of gate transistor 50 is activated, producing a gate pulse G (FIG. 5) on gate line 66, followed by a drive voltage pulse applied to base terminal 62 of drive transistor 58 producing drive pulse D (FIG. 3) on drive line 70. After gate transistor 50 is activated, but before drive transistor 58 is activated, gate line 66 and hence terminal point 94 will be brought to ground potential assuming transistor 50 operates as an ideal switch. When drive transistor 58 conducts, the source voltage $V_2$ is applied across terminals 82 and 94 which is a necessary condition for a balanced drive voltage pulse to appear across memory word 20. To the extent that diode 40 does not present an infinite impedance to terminal 94, before either a gate pulse G or drive pulse D has been applied, there will be a small reverse current through all diodes (e.g., diode 40 via resistance 102 to ground and via memory word 20 and resistance 106 to ground). Practically, the diodes may be chosen to minimize this current to the extent required by the operation of the embodiment 10. It is important that diode 40 be connected to terminal 94 on gate line 66 rather than te terminal 82 on drive line 70. Were diode 40 connected between drive line 70 from terminal 82 to the end of line 99 of transmission line transformer 96, there would be a significant voltage transient on terminals 103 and 107 during activation of gate transistor 50 such that a large noise voltage will be induced on sense line 30. A similar noise voltage will also be induced on all sense lines located along the gate line 66, e.g., sense lines 24 and 27. Such a large noise precludes satisfactory operation of such a diode matrix memory word selection technique unless something additional is accomplished. This invention provides a desirable solution for the problem.

The manner in which the unselected memory words are noise voltage isolated will now be described. For this purpose, it is assumed that memory word 18 has been selected by activation of gate transistor 48 thereby producing a voltage gate pulse G (FIG. 5) and thereafter drive transistor 58 has been activated thereby producing a voltage drive D. The voltage noise isolation in embodiment 10 will be described with reference to memory word 20. Since a gate transistor has not been activated for memory words 13, 14, 16 and 17, they are unaffected by the selection of memory word 18. However, consideration must be given to memory words 19 and 20 as they are in electrical communication with drive line 70. Further consideration must be given to memory words 12 and 15 as they are in electrical communication with gate line 64. Under the assumed condition of selection of memory word 18, gate transistor 50 was activated. Therefore, diode 40 does not conduct because terminal 94 had been established at positive potential $V_1$. Since terminal 94 is not at ground potential, the drive voltage $V_2$ is established from terminal 82 to ground 71. Transmission line transformer 96 serves as an inductor to isolate memory word 20 from this drive voltage. The potential which appears on memory word 20 is determined by the ratio of the resistance 106 to the reactance of the winding 99 of transmission line transformer 96. As resistance 106 is chosen to be much smaller than the inductive reactance, the potential applied to memory word 20 is very small. Since diode 40 is back biased, no current flows in memory word 20 because both of the conductors to the terminals 104 and 108 are at the same small potential with respect to ground.

In other words, when memory word 18 is gated, the unselected memory words 19 and 20 are at the potential of line 70 with respect to ground, i.e., they are floating. As a consequence, there would be a serious noise problem in the sense lines 29 and 30 associated with memory words 19 and 20 as they are also associated electrically with sense line 28 of memory word 18.

When drive transistor 62 is activated thereby producing a high frequency positive voltage pulses applied to terminal 82, the reactance drop in transmission line transformer conductor 99 isolates memory word 20. Therefore, for the high frequency components the winding reactance itself is sufficient to support the potential between terminals 82 and 107 while for low frequencies the ferrite core increases the reactance thereby obtaining isolation for a wide band of frequencies.

The voltage isolation of memory words 12 and 15 (FIG. 1) will now be described for the circumstance of selection of memory word 18. Before gate transistor 48 is activated, terminals 84, 85 and 86 are at positive potential $+V_1$. Since a diode is not a perfect switch, a small leakage or reverse current flows through all diodes 32 to 40 of embodiment 10 thereby producing a small positive voltage at all word terminals, e.g., terminals 103 and 107 of memory word 20. When gate transistor 48 is activated, the voltages on words 12, 15 and 18 at the terminals corresponding to terminals 103 and 107 of word 20 are brought to ground potential. Illustratively, this small voltage on memory word 12 resulting from the diode leakage current must be kept small in order to prevent noise from being induced on the sense line 22. This is accomplished by choosing a diode 32 with a back resistance much larger than the resistance 102 and 106 of transmission line transformer 42. However, resistors corresponding to 103 and 107 should not be so small as to tend to load the voltage source $V_2$ appreciably in comparison with the load effects of the selected word impedance 18. The values of the back resistance of the diode 32 and resistances 102 and 106 are design parameters which are determined in accordance with the operational requirements for the practice of the invention.

Figure 4:
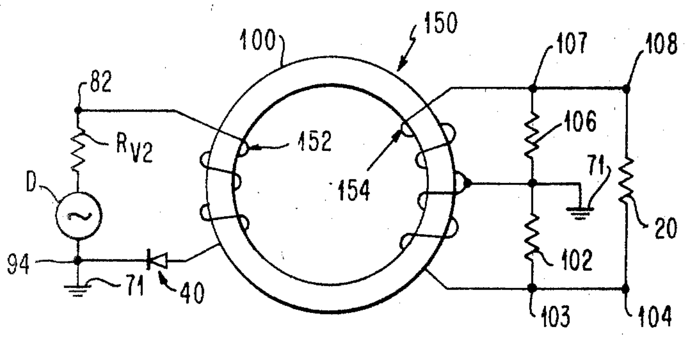
FIG. 4 is a schematic diagram of a pulse transformer with a grounded center tap on the secondary winding which is particularly suitable for the practice of this invention at relatively low frequency operation.
Figure 5:
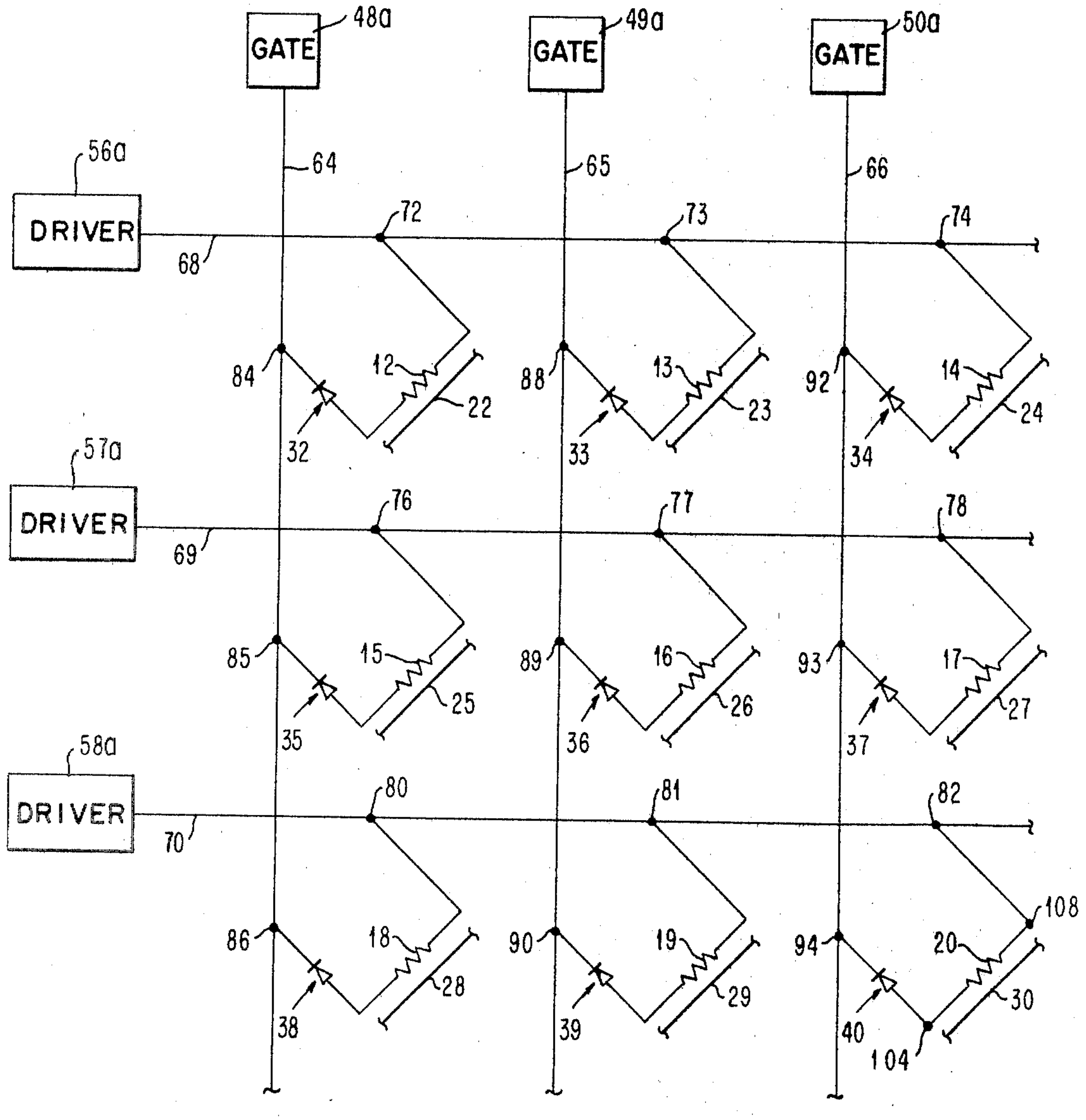
FIG. 5 is a diagram partially in block form and partially in schematic form which illustrates the general nature of a prior art diode selection matrix for memory locations.

The nature of a transmission line transformer will now be described in greater detail by comparison with a pulse transformer as part of a diode matrix for balanced drive. When a pulse transformer such as 150 of FIG. 4 is combined with the prior diode matrix of FIG. 5, a logic circuit is obtained for memory word selection which is particularly suitable for the practice of this invention at low frequency operation. For purpose of comparison several elements in FIG. 4 are given the same numbers as in FIG. 2. The pulse transformer 150 of FIG. 4 is connected to provide a balanced drive for illustrative memory word 20 (FIG. 5). FIG. 5 shows the prior art diode matrix circuit for memory word selection in which numbers are the same as for FIG. 1 for corresponding circuit elements. Gates 48*a*, 49*a*, and 50*a* are comparable to the effect of gate transistors 48 to 50, respectively, when the voltage $+V_1$ is included. A primary winding 152 is wound on ferromagnetic core 100. The secondary winding 154 is grounded center tap. Drivers 56*a*, 57*a* and 58*a* are comparable to the effect of drive transistors 56 to 58, respectively, when voltage $+V_2$ is included.

A pulse transformer 150 (FIG. 4) has a body of magnetic material 100 inductively coupled to two separate windings 152 and 154. A change in current in primary winding 152 causes a change of magnetic flux in magnetic material 100 which induces a voltage in secondary winding 154. The rise time of the output pulse is limited if the magnetic material 100 is not able to respond quickly enough in the exciting current. Furthermore, at high frequencies the stray capacitance and inductance of windings 152 and 154 results in poor transformer action, and the stray capacitance between primary and secondary windings disturbs the balance on the secondary winding. Thus, a pulse transformer is not applicable for gate pulses G and drive pulses D for a high frequencies content in the practice of this invention.

In the transmission line transformer 96 (FIG. 2) the signal between the input and output is not coupled by the magnetic material 100. The nature of the operation of a transmission line transformer is such that it does not require a ferrite core with good high frequency characteristics to provide a balanced drive for a memory word at high frequency drive pulse operation. The function of the ferrite core is to present a large impedance to the reflected or common mode voltage components from the word side of a transmission line transformer. Therefore, the rise time is determined by the transmission line comprised of conductors 98 and 99. The magnetic material 100 serves to block flow of undesired currents. Such a transformer is well suited to relatively high frequency operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for selecting a memory word from a plurality of memory words comprising, in combination:
- logic means for identifying said selected memory word; and
- transmission line transformer means coupled between said logic means and said memory words to provide a balanced drive therefor to apply in time coincidence two voltages of substantially equal magnitudes and opposite polarities to said selected memory word.

2. Apparatus for selecting a memory word from a plurality of memory words comprising, in combination:
- logic means for identifying said memory word including diode selection matrix means having gate means and driver means; and
- transmission line transformer means coupled between said diode selection matrix means and said memory words including a respective transmission line transformer connected to each said diode of said diode selection matrix and the respective memory word.

3. Apparatus according to claim 2 in which said transmission line transformer has a center tap grounded resistance across its terminals whose half magnitude is small in order to minimize the potential rise at the selected memory word terminals, but not so small as to load the driver means and gate means appreciably in comparison with the loading due to said selected memory word.

4. Apparatus for selecting a memory word from a plurality of memory words comprising, in combination:
- logic means for identifying said selected memory word including diode selection matrix means, having gate means and driver means; and
- pulse transformer means coupled between said diode selection matrix means and said memory words including a respective pulse transformer connected to each said diode of said diode selection matrix and the respective memory word, each said pulse transformer having means connected across its terminals to minimize the potential rise at the selected memory word terminals, but not to load the driver means and gate means appreciably in comparison with the loading due to said selected memory word.

5. Apparatus for selecting an impedance load from a plurality of impedance loads comprising, in combination: logic means for identifying said selected load; and new transmission line transformer means coupled between said logic means and said impedance loads to provide a balanced drive therefor to apply in time coincidence two voltages o fsubstantially equal magnitudes and opposite polarities to said selected impedance load, only one respective transmission line transformer of said transformer means being coupled to only one respective impedance load for applying said balanced drive thereto.

6. Apparatus for selection of an impedance load from a plurality of impedance loads comprising, in combination:

logic means connected to the selected impedance load having diode matrix means, said diode matrix means including a gate circuit, a drive circuit and a diode for each of said plurality of impedance loads; and transformer circuit means coupled between each said diode and said load, respectively, to obtain a balanced drive therefor, said transformer circuit means including a transmission line transformer device for each said load.

7. Apparatus for selecting an impedance load from a plurality of impedance loads comprising, in combination:

logic means for identifying said selected impedance load; and transmission line transformer means coupled between said logic means and said impedance loads to provide a balanced drive therefor.

8. Apparatus for selecting a memory word from a plurality of memory words comprising, in combination:

logic means for identifying said memory word including selection matrix means having gate means, dirver means, and current switch means; and transmission line transformer means coupled between said selection matrix means and said memory words including a respective transmission line transformer connected to a respective current switch of said current switch means and the respective memory word.

9. Apparatus for selecting a memory word from a plurality of memory words comprising, in combination:

logic means for identifying said selected memory word including diode selection matrix means having gate means and driver means; and pulse transformer means coupled between said diode selection matrix means and said memory words including a respective pulse transformer connected to each said diode of said diode selection matrix and the respective memory word, each said pulse transformer having a center tap grounded resistance across its terminals whose half magnitude is small in order to minimize the potential rise at the selected memory word terminals, but not so small as to load the driver means and gate means appreciably in comparison with the loading due to said selected memory word.

10. Apparatus for selection of an impedance load from a plurality of impedance loads comprising, in combination:

logic means connected to the selected impedance load including selection matrix means having gate means, driver means, and current switch means; and transmission line transformer means coupled between said selection matrix means and said impedance loads including a respective transmission line transformer connected to a respective current switch of said current switch means and the respective impedance load to obtain a balanced drive therefor.

11. Apparatus for selecting a memory location from a plurality of memory locations comprising, in combination:

logic means for identifying said selected memory location; and transmission lines transformer means coupled between said logic means and said locations for applying a balanced voltage to said selected memory location and for isolating said unselected memory locations from voltage.

12. Apparatus for selecting a memory word from a plurality of memory words comprising, in combination:

logic means for identifying said memory word including selection matrix means having gate means, driver means, and current switch means; and transformer means coupled between said selection matrix means and said memory words including a respective transformer connected to a respective current switch of said current switch means and the respective memory word, each said transformer having means connected across its terminals to minimize the potential rise at the selected memory word terminals, but not to load the driver means and gate means appreciably in comparison with the loading due to said selected memory word.

13. Apparatus according to claim 12 in which said transformer means is a transmission line transformer means and said respective transformer is a transmission line transformer.

References Cited

UNITED STATES PATENTS

| | | | |
|---|---|---|---|
| 3,164,810 | 1/1965 | Harding | 340—174 |
| 3,165,642 | 1/1965 | Noll | 340—174 X |
| 3,395,404 | 7/1968 | Bittmann et al. | 340—174 |

OTHER REFERENCES

International Solid State Circuits Conference: Session XII: Memory; Thin Film Memory Drive and Sense Techniques for Realizing a 167–N sec. Read/Write Cycle by Bates et al.; pp. 106, 107; February 21, 1964.

STANLEY M. URYNOWICZ, Jr., Primary Examiner